United States Patent
Jung et al.

(10) Patent No.: US 8,306,352 B2
(45) Date of Patent: Nov. 6, 2012

(54) IMAGE PROCESSING METHOD AND APPARATUS

(75) Inventors: Jung Hun Jung, Goonpo-si (KR); Yong Seok Cho, Seoul (KR)

(73) Assignee: HUMAX Co., Ltd., Seongnam-si, Gyeonggi-do (KR)

( * ) Notice: Subject to any disclaimer, the term of this patent is extended or adjusted under 35 U.S.C. 154(b) by 1212 days.

(21) Appl. No.: 12/093,516

(22) PCT Filed: Nov. 21, 2006

(86) PCT No.: PCT/KR2006/004892
§ 371 (c)(1),
(2), (4) Date: May 13, 2008

(87) PCT Pub. No.: WO2007/061207
PCT Pub. Date: May 31, 2007

(65) Prior Publication Data
US 2008/0273811 A1    Nov. 6, 2008

(30) Foreign Application Priority Data
Nov. 22, 2005 (KR) ........................ 10-2005-0111665

(51) Int. Cl.
*G06K 9/40* (2006.01)
(52) U.S. Cl. ......... 382/266; 382/272; 382/273; 382/274
(58) Field of Classification Search .......... 382/254–266, 382/270–274
See application file for complete search history.

(56) References Cited

U.S. PATENT DOCUMENTS

| 6,301,395 | B1 | 10/2001 | Nishigaki et al. | 382/266 |
| 6,690,429 | B1* | 2/2004 | Kim | 348/625 |
| 6,697,537 | B2 | 2/2004 | Norimatsu | 382/275 |
| 6,778,297 | B1 | 8/2004 | Fujiwara | 358/1.9 |
| 2002/0006230 | A1* | 1/2002 | Enomoto | 382/261 |

FOREIGN PATENT DOCUMENTS

JP    05-316393 A    11/1993
JP    2002-112036    4/2002

(Continued)

OTHER PUBLICATIONS

Korean Office Action dated Dec. 12, 2006 issued in Application No. 10-2005-0111665.

(Continued)

*Primary Examiner* — Wesley Tucker
(74) *Attorney, Agent, or Firm* — KED & Associates, LLP (57) ABSTRACT

Disclosed is an edge sharpening method using maximum and minimum filters. In an embodiment of the present invention, the edge region of an input image signal is detected, minimum and maximum signals are generated for the detected edge region, the input signal of the detected edge region is compared with the average signal of the minimum and maximum signals, and the average of the input signal and the maximum signal is output if the input signal is larger than the average signal, the average of the input signal and the minimum signal is output if the input signal is smaller than the average signal, and the input signal is output if the input signal is equal to the average signal. Meanwhile, median filtering, using a window perpendicular to the direction in which the edge sharpening is performed, is performed on the region on which the edge sharpening has been performed.

16 Claims, 6 Drawing Sheets

FOREIGN PATENT DOCUMENTS

| | | |
|---|---|---|
| JP | 2004-214977 | 7/2004 |
| JP | 2005-260534 A | 9/2005 |
| KR | 10-2000-0008687 A | 2/2000 |
| KR | 10-2000-0055400 A | 9/2000 |
| KR | 10-2002-0033973 A | 5/2002 |

OTHER PUBLICATIONS

Korean Notice of Allowance dated Sep. 28, 2007 issued in Application No. 10-2005-0111665.

PCT International Search Report dated Feb. 26, 2007.

* cited by examiner

IMAGE PROCESSING METHOD AND APPARATUS

TECHNICAL FIELD

The present invention relates, in general, to an image processing method and apparatus and, more particularly, to a method of sharpening an edge.

BACKGROUND ART

In general, an unsharp masking method or a high boost method is used as an edge sharpening method for improving the sharpness of a television screen image.

Figure 1:
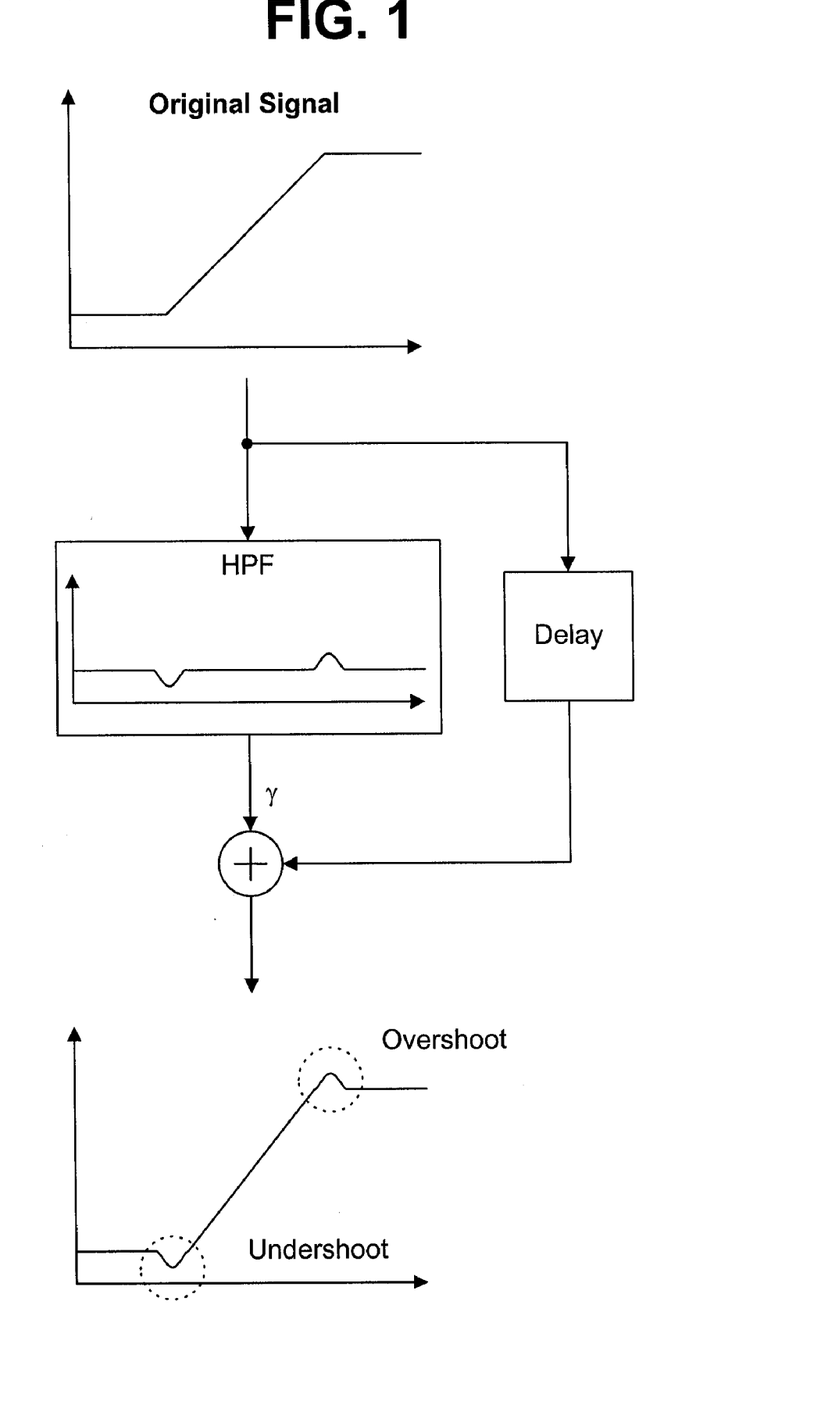
FIGS. 1 and 2 are views illustrating examples in which overshoot and undershoot are generated by general edge sharpening methods.

For example, as shown in FIG. 1, an unsharp masking method causes overshoot and undershoot to occur in an edge region by extracting high frequency components through the passing of an original signal through a High Pass Filter (HPF), and performing weighted adding on the high frequency components and the original signal that has been delayed by a predetermined period.

Figure 2:
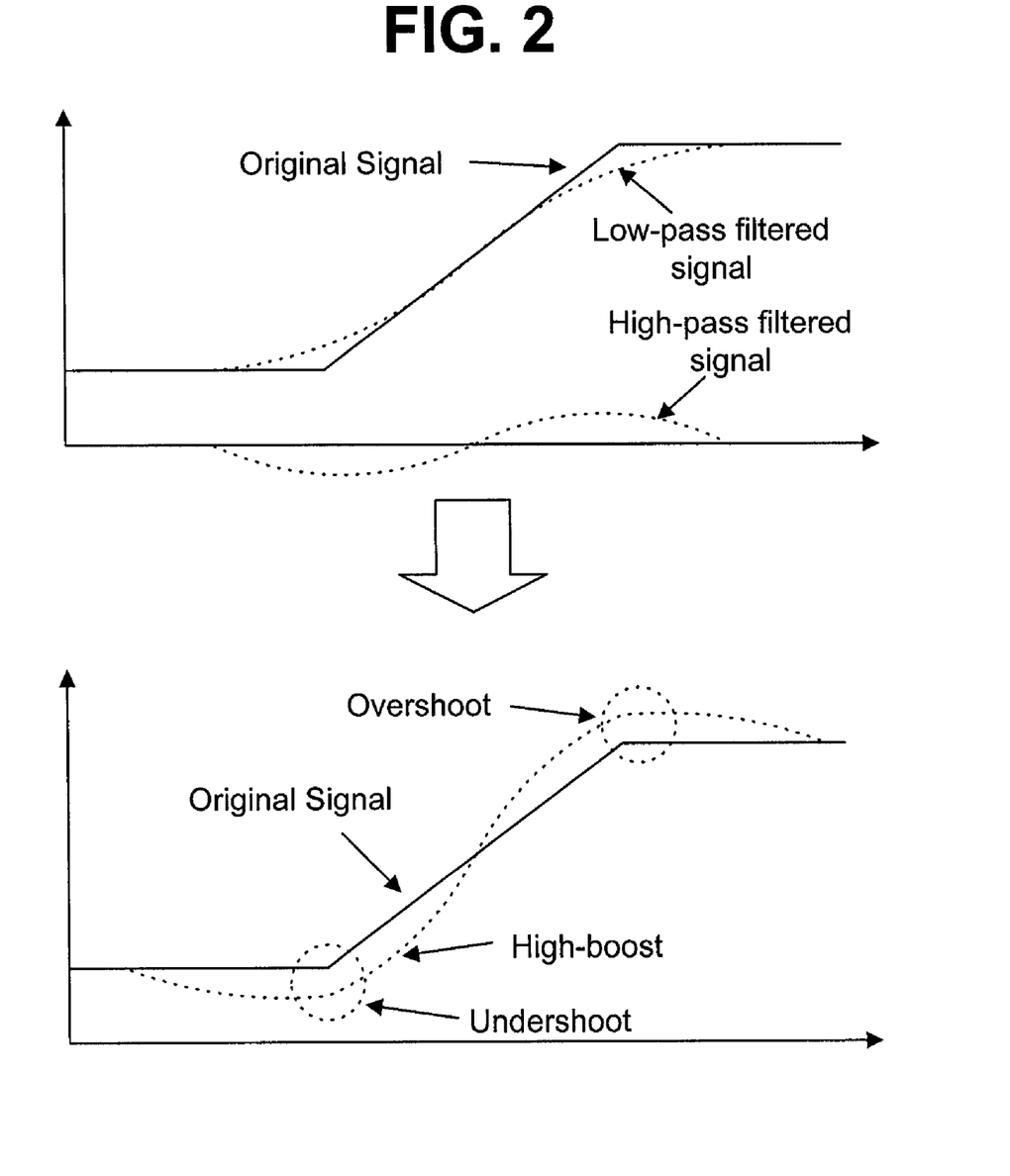

FIG. 2 illustrates a high boost method that generalizes the unsharp masking method. The high boost method not only makes the slope of an edge region steeper, but also causes overshoot and undershoot to occur by extracting low and high frequency components from an original signal and adding the low and high frequency components to the original signal.

The above methods increase the difference in the brightness of an edge region by forcibly generating overshoot or undershoot, rather than seeking the actual shape of a smooth edge, thereby causing a human's sense of vision to sense a greater quantity of sharpness. However, the above methods have the problem of image distortion, such as the generation of a banding pattern in an edge region, due to the overshoot or undershoot.

DISCLOSURE OF INVENTION

Accordingly, the present invention has been made keeping in mind the above problems occurring in the prior art, and an object of the present invention is to provide a method of sharpening an edge while effectively preventing image distortion.

In order to accomplish the above object, the present invention provides an image processing method, comprising the steps of detecting an edge region from an image input signal; and performing edge sharpening on the detected edge region using minimum/maximum filters.

In an embodiment, minimum and maximum signals for the detected edge region are created, the input signal of the detected edge region is compared with the average signal of the minimum and maximum signals, and the average of the input and maximum signals is output if the input signal is larger than the average signal, the average of the input and minimum signals are output if the input signal is smaller than the average signal, and the input signal is output if the input signal is equal to the average signal.

In an embodiment, median filtering may be applied to the edge-sharpened region, and a window having a direction perpendicular to a direction in which the edge sharpening is performed may be used for the median filtering.

The steps of detecting the edge region, performing edge sharpening and applying the median filtering may be performed in respective directions in a sequence of a horizontal direction and a vertical direction or a sequence of a vertical direction and a horizontal direction.

The input signal and the edge-sharpened signal undergo weighted adding and then a resulting signal is output.

An image processing apparatus according to another embodiment of the present invention includes an edge detection unit for detecting the edge region of an input image signal; a maximum/minimum filtering unit for creating minimum and maximum signals for the detected edge region; and an edge sharpening unit for comparing the input signal of the detected edge region with the average signal of the minimum and maximum signals, and selectively outputting the input signal, the average of the input and minimum signals, or the average of the input and maximum signals depending on the result of the comparison.

MODES FOR CARRYING OUT THE INVENTION

Preferred embodiments of an edge sharpening method and apparatus according to the present invention are described in detail with reference to the accompanying drawings below.

Figure 3:
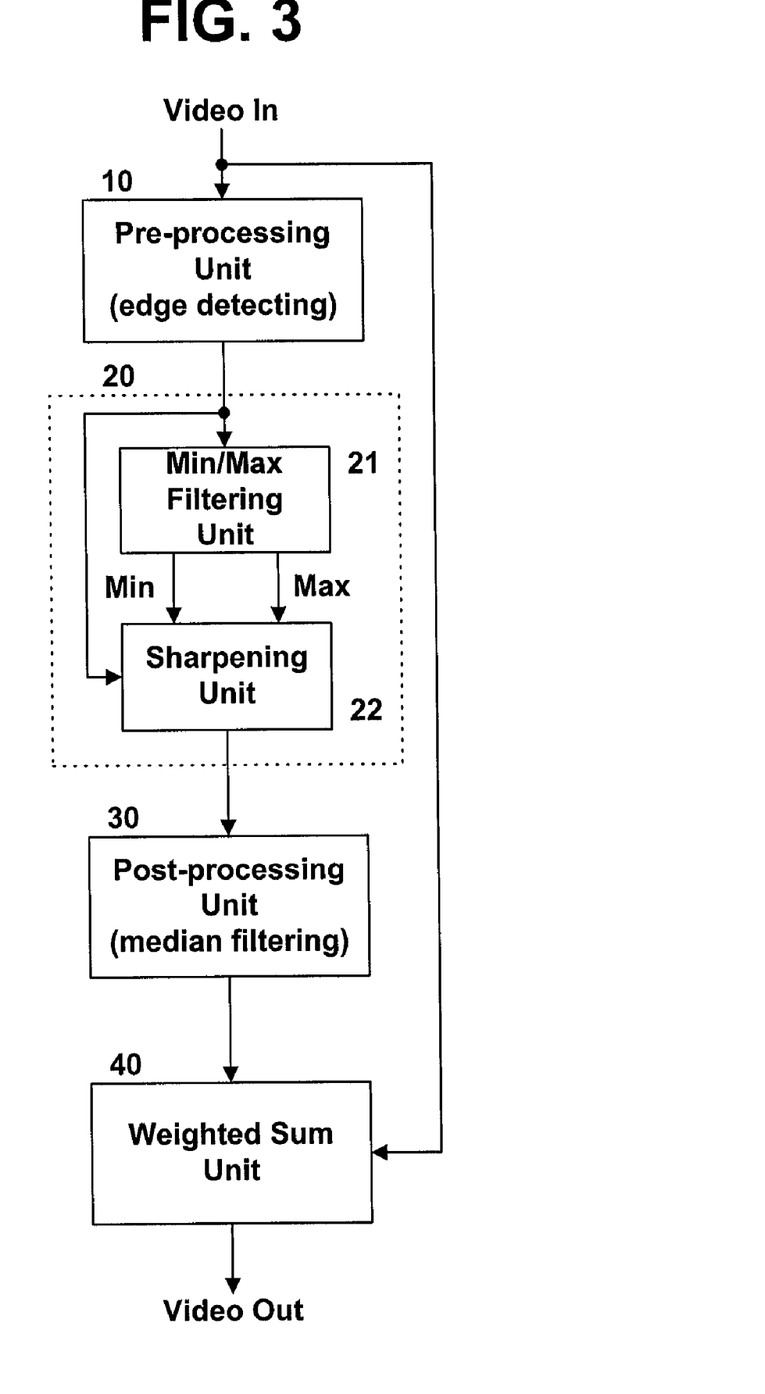
FIG. 3 is a view illustrating the construction of an edge sharpening apparatus according to an embodiment of the present invention.

FIG. 3 illustrates the construction of an edge sharpening apparatus using minimum and maximum filters according to an embodiment of the present invention.

The edge sharpening apparatus may be constructed to include a pre-processing unit 10 for detecting an edge region, an average minimum/maximum filtering unit 20 for sharpening the detected edge region, a post-processing unit 30 for reducing discontinuous distortion, and a weighted sum unit 40 for eliminating aliasing.

The average minimum/maximum filtering unit 20 may include a minimum/maximum filtering unit 21 for outputting the minimum and maximum signals of the detected edge region, and a sharpening unit 22 for sharpening the edge region using the minimum and maximum signals.

The edge sharpening apparatus, with respect to an input image signal, sharpens a horizontal edge region and then sharpens a vertical edge region, or sharpens a vertical edge region and then sharpens a horizontal edge region, using the pre-processing unit 10, the average minimum/maximum filtering unit 20 and the post-processing unit 30, and performs weighted adding on the input signal and the edge-sharpened signals using the weighted sum unit 40 after sharpening the edge regions in the respective directions.

The pre-processing unit 10 eliminates unnecessary information, such as noise, from an image signal, and detects a vertical edge region and/or a horizontal edge region. The pre-processing unit 10 may detect an edge using a simple method employing a homogeneity operator technique or difference operator technique, a first-order differential method employing a Roberts, Prewitt, Sobel et al.'s convolution mask, or a second-order differential method.

The minimum/maximum filtering unit 21 creates a minimum signal (Min) and a maximum signal (Max) for the input signal of the detected edge region, and the sharpening unit 22 calculates the average value of the minimum and maximum signals ((Min+Max)/2) and compares the input signal of the detected edge region with the average value. For example, the sharpening unit 22 outputs the average value of the input signal and the maximum signal ((Input+Max)/2) if the input signal is larger than the first average value, outputs the average value of the input signal and the minimum signal ((Input+Min)/2) if the input signal is smaller than the first average value, and outputs the input signal Input if the input signal is equal to the first average value.

Through the above-described operation of sharpening an edge region in the average minimum/maximum filtering unit 21, a sharpened edge can be obtained. However, impulse noise that causes discontinuity in a direction tangent to the edge may occur.

The post-processing unit 30 performs post-processing on a signal, outputted from the average minimum/maximum filtering unit 21, by using a median filter, which is robust to impulse noise. If sharpening has been performed on a horizontal edge region, median filtering using a vertical window or mask is performed, and if sharpening has been performed on a vertical edge region, median filtering is performed in a horizontal direction.

Thereafter, the weighted sum unit 40 outputs a signal that is obtained by adding the edge-shaped signal in horizontal and vertical edge regions and the input signal with different weights to each other, thereby reducing aliasing distortion that may occur due to edge sharpening.

Figure 4:
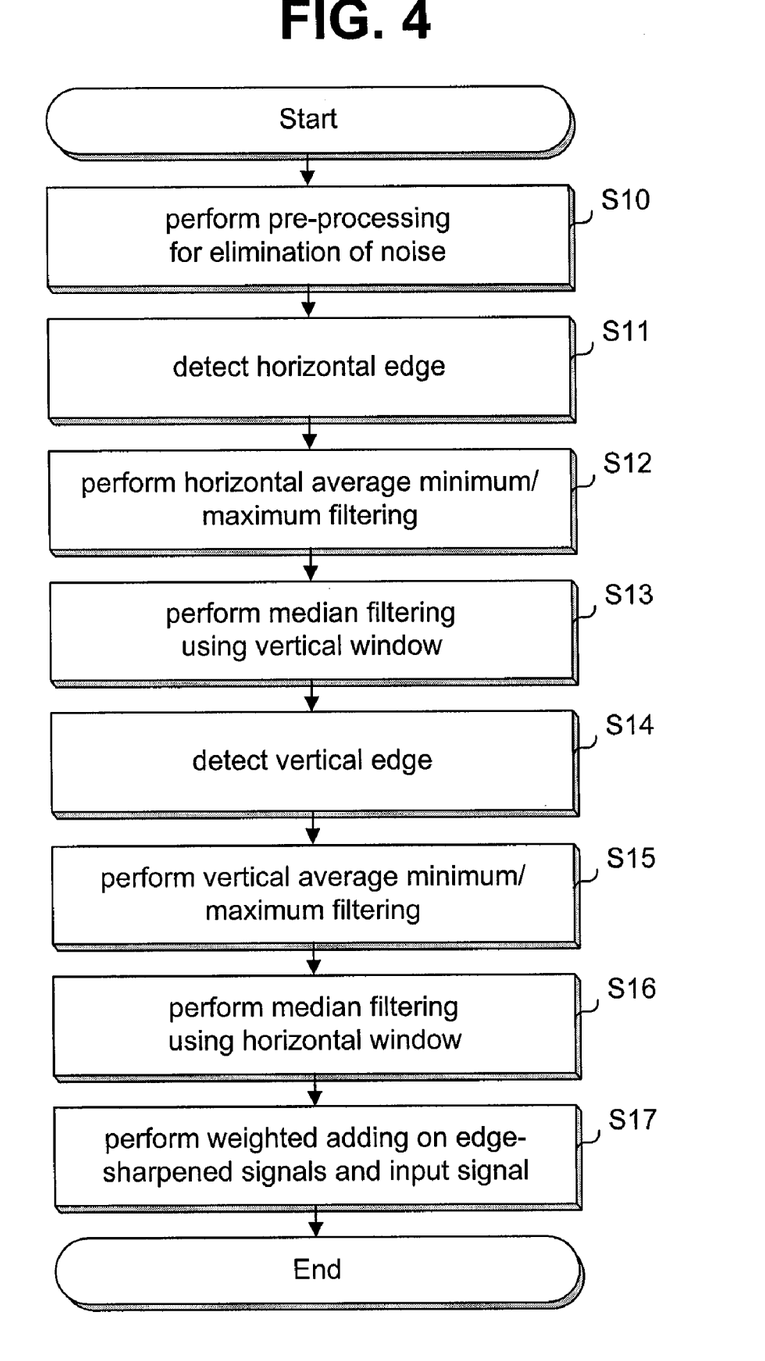
FIG. 4 is a flowchart illustrating the overall process of an edge sharpening method according to the present invention.

FIG. 4 is a flowchart illustrating the overall process of an edge sharpening method according to the present invention.

First, pre-processing for eliminating unnecessary information, such as noise, which is included in an input signal, is performed at step S10. Thereafter, the sharpening of a horizontal edge region, the sharpening of a vertical edge region, and the weighted adding of the input signal and the edge-sharpened signal to each other are performed.

The horizontal edge region is detected from the input signal from which the noise has been eliminated at step S11. A minimum signal and a maximum signal for the input signal of the detected edge region are created, and average maximum/minimum filtering according to the present invention is performed based on the created minimum and maximum signals, thereby creating a signal having a sharp horizontal edge at step S12. Median filtering using a vertical window is applied to the created signal, therefore a signal from which horizontal impulse noise has been eliminated is output at step S13.

A horizontal edge region is detected from the input signal on which the sharpening of the vertical edge region has been performed at step S14. A minimum signal and a maximum signal for the input signal of the detected edge region are created, and average maximum/minimum filtering according to the present invention is performed based on the created minimum and maximum signals, thereby creating a signal having a sharp vertical edge region at step S15. Median filtering using a horizontal window is applied to the created signal, therefore a signal from which horizontal impulse noise has been eliminated is output at step S16.

Thereafter, weighted adding is performed on the edge-sharpened signals and the input signal, therefore a signal the aliasing distortion of which has been reduced by the edge sharpening, is created at step S17.

Figure 5:
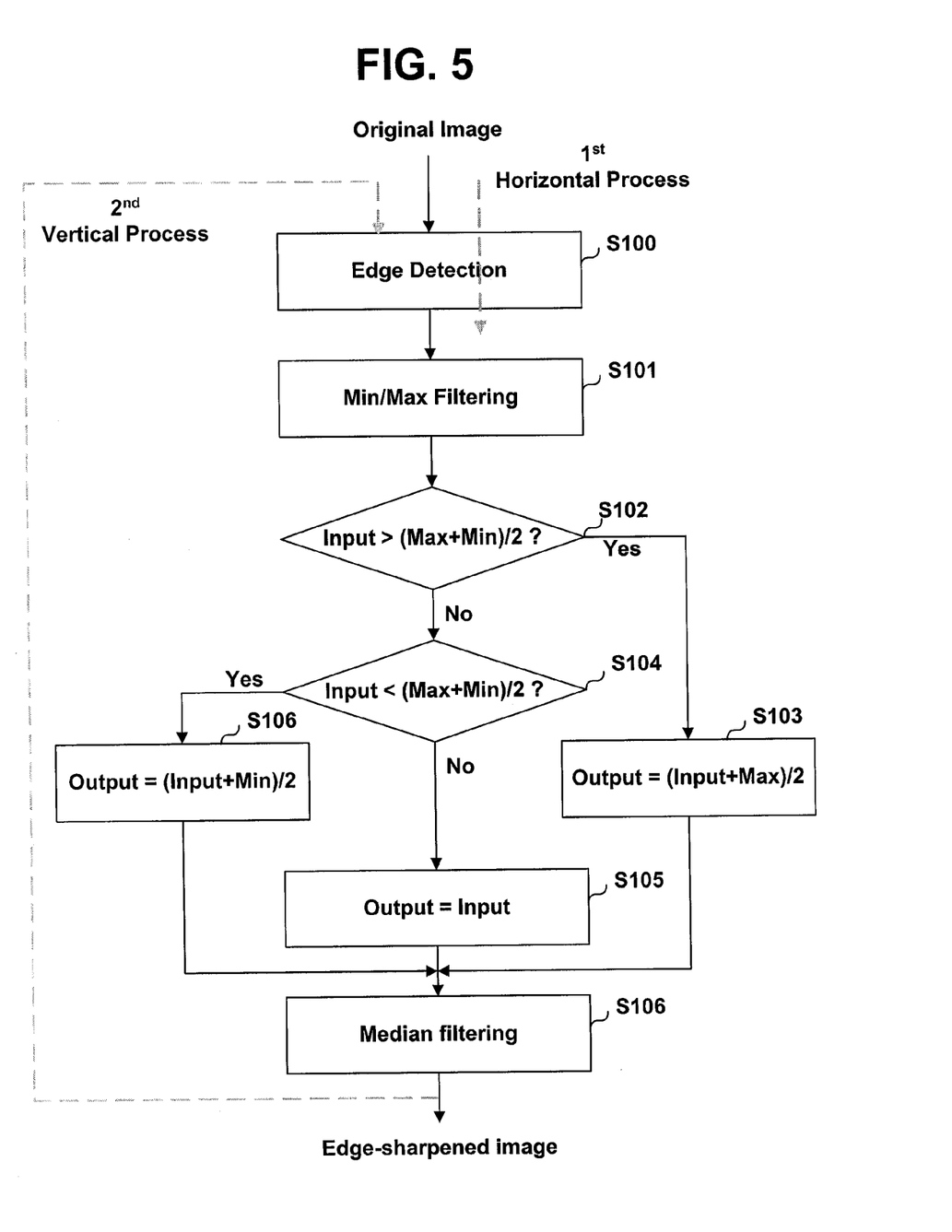
FIG. 5 is a view illustrating an average minimum/maximum filtering process for edge sharpening.

FIG. 5 illustrates an average minimum/maximum filtering process for edge sharpening.

The pre-processing unit 10 detects a horizontal edge region from an input signal using a homogeneity operator technique or a difference operator technique at step S100. A window having a size corresponding to three pixels is generally used for the detection of the edge region.

The minimum/maximum filtering unit 21 creates a minimum signal (Min) having a minimum luminance value and a maximum signal (Max) having a maximum luminance value while moving a window having a size corresponding to a predetermined number of pixels, for example, three pixels with respect to the detected edge region at step S101. The minimum and maximum signals in the edge region are illustrated in FIG. 6(*a*).

The sharpening unit 22 calculates the average value of the minimum and maximum signals ((Max+Min)/2) and compares the average value with the original input signal at steps S102 and S104. In FIG. 6(*b*), the original input signal and the average value are compared with each other and are illustrated.

The sharpening unit 22 outputs the average value of the input signal and the maximum signal ((Input+Max)/2) at step S103 if the input signal is larger than the average value ((Max+Min)/2), outputs the input signal without changing it at step S105 if the input signal is equal to the first average value, and outputs the average value of the input signal and the minimum signal ((Input+Min)/2) at step S106 if the input signal is smaller than the first average value.

Figure 6:
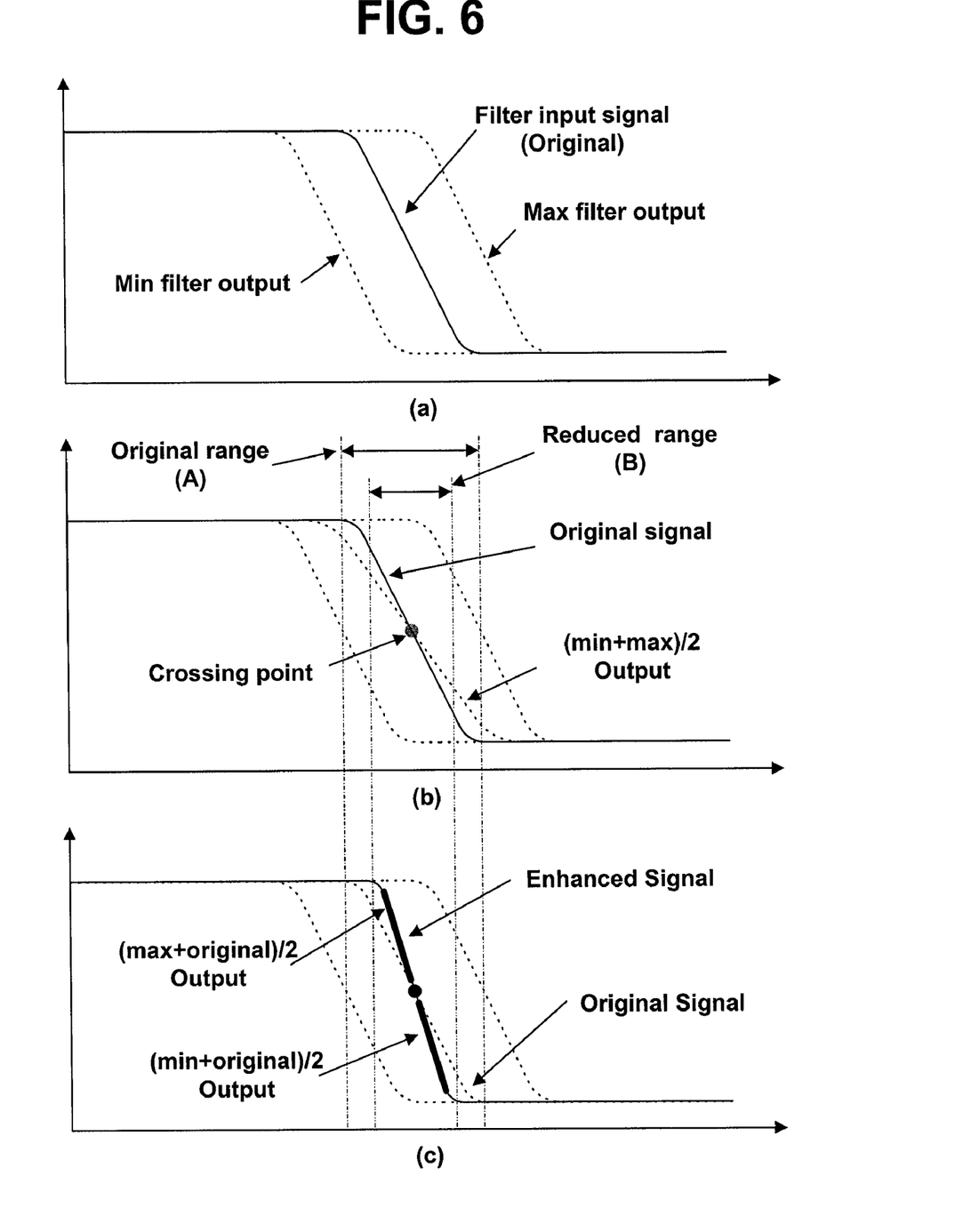
FIG. 6 is graphs illustrating comparisons between the input and output signals of average minimum/maximum filtering according to the present invention.

From FIG. 6(*c*), it can be seen that the range B of the edge region of an output signal from the sharpening unit 22 has been reduced to a range narrower than the range A of the edge region of the original input signal, which means that the edge has been sharpened.

Thereafter, the post-processing unit 30 performs median filtering so as to eliminate impulse noise that occurs in the signal the range of the edge region of which has been reduced at step S1007, wherein a window having a direction perpendicular to the direction in which edge sharpening is performed is used.

Then, after the horizontal edge sharpening is completed as described above, vertical edge sharpening is performed in a similar manner.

Compared with existing edge sharpening using visual characteristics, the present invention can detect only an edge region without distorting an image and then output a highly sharpened signal, thereby achieving the effect of obtaining a natural and sharp image.

The above-described preferred embodiments of the present invention have been disclosed for illustrative purposes, and those skilled in the art can make various modifications, additions and substitutions within the technical spirit and scope of the invention disclosed in the accompanying claims.

The invention claimed is:

1. An image processing method, comprising:
   detecting an edge region from an image input signal; and
   performing edge sharpening on the detected edge region using a minimum filter and a maximum filter,
   wherein the performing the edge sharpening includes:
      creating minimum and maximum signals for the detected edge region,
      comparing an input signal of the detected edge region with an average signal of the minimum and maximum signals, and
      outputting an average of the input and maximum signals when the input signal is larger than the average signal of the minimum and maximum signals, outputting an average of the input and minimum signals when the input signal is smaller than the average signal of the minimum and maximum signals, and outputting the input signal when the input signal is equal to the average signal of the minimum and maximum signals.

2. The image processing method as set forth in claim 1, further comprising applying median filtering to the edge-sharpened region.

3. The image processing method as set forth in claim 2, wherein a window having a direction perpendicular to a direction in which the edge sharpening is performed is used for the median filtering.

4. The image processing method as set forth in claim 2, wherein detecting the edge region, performing edge sharpening and applying the median filtering are performed in respective directions in a sequence of a horizontal direction and a vertical direction or a sequence of a vertical direction and a horizontal direction.

5. The image processing method as set forth in claim 1, wherein detecting the edge region and performing edge sharpening are performed in respective directions in a sequence of a horizontal direction and a vertical direction or a sequence of a vertical direction and a horizontal direction.

6. The image processing method as set forth in claim 1, further comprising performing weighted adding on the input signal and the edge-sharpened signal.

7. The image processing method as set forth in claim 2, further comprising performing weighted adding on the input signal and the median-filtered signal.

8. An image processing apparatus, comprising:
an edge detection unit for detecting an edge region of an input image signal;
a maximum/minimum filtering unit for creating minimum and maximum signals for the detected edge region using a minimum filter and a maximum filter; and
an edge sharpening unit for comparing an input signal of the detected edge region with an average signal of the minimum and maximum signals, and outputting an average of the input and maximum signals when the input signal is larger than the average signal of the minimum and maximum signals, outputting an average of the input and minimum signals when the input signal is smaller than the average signal of the minimum and maximum signals, and outputting the input signal when the input signal is equal to the average signal of the minimum and maximum signals.

9. The image processing apparatus as set forth in claim 8, further comprising a median filtering unit for performing median filtering on an output of the edge sharpening unit with respect to the edge region.

10. The image processing apparatus as set forth in claim 9, wherein a window having a direction perpendicular to a direction in which the edge sharpening is performed is used for the median filtering.

11. The image processing apparatus as set forth in claim 8, wherein the operations of detecting the edge region and performing edge sharpening are performed in respective directions in a sequence of a horizontal direction and a vertical direction or a sequence of a vertical direction and a horizontal direction.

12. The image processing apparatus as set forth in claim 9, further comprising a weighted adding unit for performing weighted adding on the input signal and the median-filtered signal.

13. An image processing method, comprising:
receiving an image input signal;
detecting an edge region from the image input signal; and
performing edge sharpening on the detected edge region,
wherein the performing the edge sharpening includes:
providing a minimum signal for the detected edge region by using a minimum filter,
providing a maximum signal for the detected edge region by using a maximum filter,
determining an average signal of the minimum signal and the maximum signal,
comparing an input signal of the detected edge region and the determined average signal, and
outputting an average of the input signal and the maximum signal when the input signal is determined to be larger than the average signal based on the comparing, outputting an average of the input signal and the minimum signal when the input signal is determined to be smeller than the average signal based on the comparing, and outputting the input signal when the input signal is determined to be equal to the average signal based on the comparing.

14. The image processing method as set forth in claim 13, further comprising applying median filtering to the edge-sharpened region.

15. The image processing method as set forth in claim 14, wherein applying the median filtering includes using a window having a direction perpendicular to a direction in which the edge sharpening is performed.

16. The image processing method as set forth in claim 14, further comprising performing weighted adding on the input signal and the median-filtered signal.

* * * * *